(12) United States Patent
Sharman

(10) Patent No.: US 7,330,287 B2
(45) Date of Patent: Feb. 12, 2008

(54) TONE SCALE ADJUSTMENT

(75) Inventor: Richard A. Sharman, Dunstable (GB)

(73) Assignee: Eastman Kodak Company, Rochester, NY (US)

( * ) Notice: Subject to any disclaimer, the term of this patent is extended or adjusted under 35 U.S.C. 154(b) by 1143 days.

(21) Appl. No.: 10/225,762

(22) Filed: Aug. 22, 2002

(65) Prior Publication Data

US 2003/0038957 A1 Feb. 27, 2003

(30) Foreign Application Priority Data

Aug. 23, 2001 (GB) ................................. 0120491.6
Mar. 1, 2002 (GB) ................................. 0204857.7

(51) Int. Cl.
*G06F 15/00* (2006.01)

(52) U.S. Cl. ................. 358/1.9; 358/519; 358/522; 382/167

(58) Field of Classification Search .......... 358/1.9, 358/519, 522; 382/167
See application file for complete search history.

(56) References Cited

U.S. PATENT DOCUMENTS

| 4,402,015 | A | * | 8/1983 | Yamada ................. 358/448 |
| 4,500,919 | A | * | 2/1985 | Schreiber ............... 358/518 |
| 4,984,071 | A |   | 1/1991 | Yonezawa |
| 5,062,058 | A |   | 10/1991 | Morikawa |
| 5,172,224 | A | * | 12/1992 | Collette et al. .......... 358/515 |
| 5,754,222 | A | * | 5/1998 | Daly et al. ............... 348/184 |
| 5,812,286 | A | * | 9/1998 | Lin ......................... 358/519 |
| 5,822,453 | A |   | 10/1998 | Lee et al. |
| 5,926,562 | A | * | 7/1999 | Hyodo et al. ............ 382/167 |
| 6,236,751 | B1 |  | 5/2001 | Farrell |
| 6,438,264 | B1 |  | 8/2002 | Gallagher et al. |
| 6,493,468 | B1 | * | 12/2002 | Matsuura ................ 382/274 |
| 6,574,365 | B1 | * | 6/2003 | Weldy ..................... 382/167 |
| 6,781,713 | B1 | * | 8/2004 | Gilman et al. ........... 358/1.9 |

FOREIGN PATENT DOCUMENTS

EP 0 335 419 3/1989
EP 1 107 176 6/2001

OTHER PUBLICATIONS

Reference Input/Output Medium Metric RGB Color Encodings (RIMM/ROMM RGB; Spaulding et al.; IS&T's 2000 PICS Conference; pp. 155-163. Mar. 26-29, 2000.
Appendix D: Adaptation of Digital Color Management; Giorgianni et al.; pp. 473.

* cited by examiner

*Primary Examiner*—Kimberly Williams
*Assistant Examiner*—Michael Burleson
(74) *Attorney, Agent, or Firm*—Frank Pincelli

(57) ABSTRACT

A method of processing data from a digital image to optimize the tonescale to a printer being used without operator intervention adjusts the gain and offset of the input image data to occupy the full range of the printer, adjusts the shadow and highlight regions of the input image data to move that data distribution to that expected of the printer and then uses a gamma correction stage to move the mean level of the image data toward that expected for the printer.

44 Claims, 3 Drawing Sheets

TONE SCALE ADJUSTMENT

CROSS REFERENCE TO RELATED APPLICATIONS

This is a U.S. original patent application which claims priority on Great Britain patent application Nos. 0120491.6 filed Aug. 23, 2001 and 0204857.7 filed Mar. 1, 2002.

FIELD OF THE INVENTION

The invention relates to a method of processing a digital input image, in particular to optimize the tone scale of the input image to a known transfer function of, for example, an sRGB printer.

BACKGROUND OF THE INVENTION

The proportion of digital images from 'unknown' sources is growing with the increasing use of digital images in the home, office and the internet. Even if the originating equipment provides data in the image file header, meta-data, any subsequent processing could either remove the meta-data or render it useless. The images may be from any digital source such as digital cameras, scanners or camcorders or self generated on the computer.

There are a number of 'fixing' algorithms that attempt to correct for poor quality images, such as 'Auto-levels' in Adobe Photo-shop. These attempt to improve the appearance of the image on the computer display screen but do not take into account any printer characteristic. U.S. Pat. No. 5,812,286 pins the 'black ' and 'white' point of each color and uses the median to modify the gamma value but does not relate the changes back to a known printer transfer characteristic. U.S. Pat. No. 5,062,058 uses the cumulative density histogram to set the highlight and shadow points using a display. U.S. Pat. No. 4,984,071 uses the cumulative histogram to generate reference color density values by averaging the shadow and highlight densities for each color. Depending on the method used, the highlight and shadow points are specified with one of the reference color density values.

Computers are increasingly using color management and printer profiles to improve the rendition of printed images, but they cannot take into account the tone characteristics of a digital image that has been through several stages of adjustment.

The invention aims to allow the tone scale of an input digital image from any source to be optimized for the printer being used, the printer transfer characteristic being known, or a processing space, such as ROMM The definition of the ROMM metric and encoding is described in "Reference Input/Output Medium Metric RGB Color Encodings (RIMM/ROMM RGB), presented by K. E. Spaulding, G. J. Woolfe, E. J. Giorgianni, at PICS 2000 Conference, Mar. 26-29, 2000, Portland Oreg.

SUMMARY OF THE INVENTION

According to the present invention there is provided a method of processing data from a digital image to optimize the tone scale thereof to a printer or processing space to be used, the method comprising the steps of adjusting the gain and offset of the input image data to occupy the full input range of the printer or processing space, adjusting the shadow and highlight slopes of the input image data to move the image data distribution toward that expected for a typical image for the printer or processing space, and then using a gamma correction stage to move the mean level of the image data toward that expected for the printer or processing space.

The invention further provides a computer program product for processing data from a digital image to optimize the tonescale thereof to a printer or processing space to be used comprising a computer readable storage medium having a computer program stored thereon for performing the steps of adjusting the gain and offset of the input image data to occupy the full input range of the printer or processing space used, adjusting the shadow and highlight slopes of the input image data to move the image data distribution toward that expected for a typical image for the printer or processing space, and then using a gamma correction stage to move the mean level of the image data toward that expected for the printer or processing space.

The invention allows the tone scale of a digital input image to be optimized to the known transfer function of a printer, or to a processing space, with no operator intervention.

BRIEF DESCRIPTION OF THE DRAWINGS

The invention will now be described, by way of example, with reference to the accompanying drawings, in which.

DETAILED DESCRIPTION OF THE INVENTION

Figure 2:
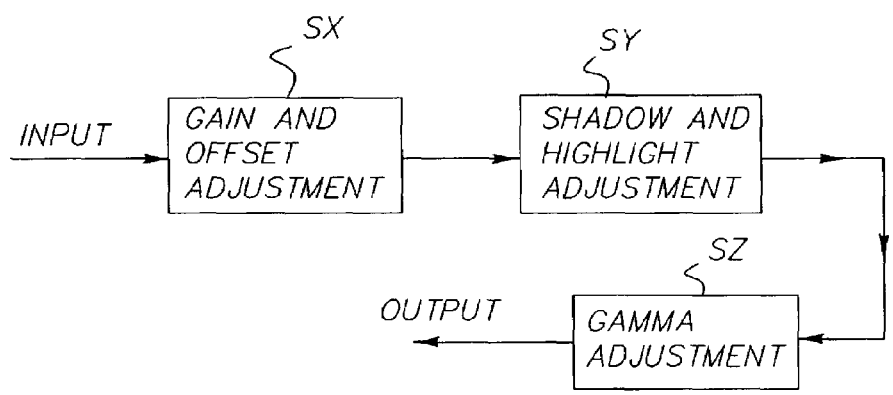
FIG. 2 is a block diagram illustrating the method of the invention.
Figure 3:
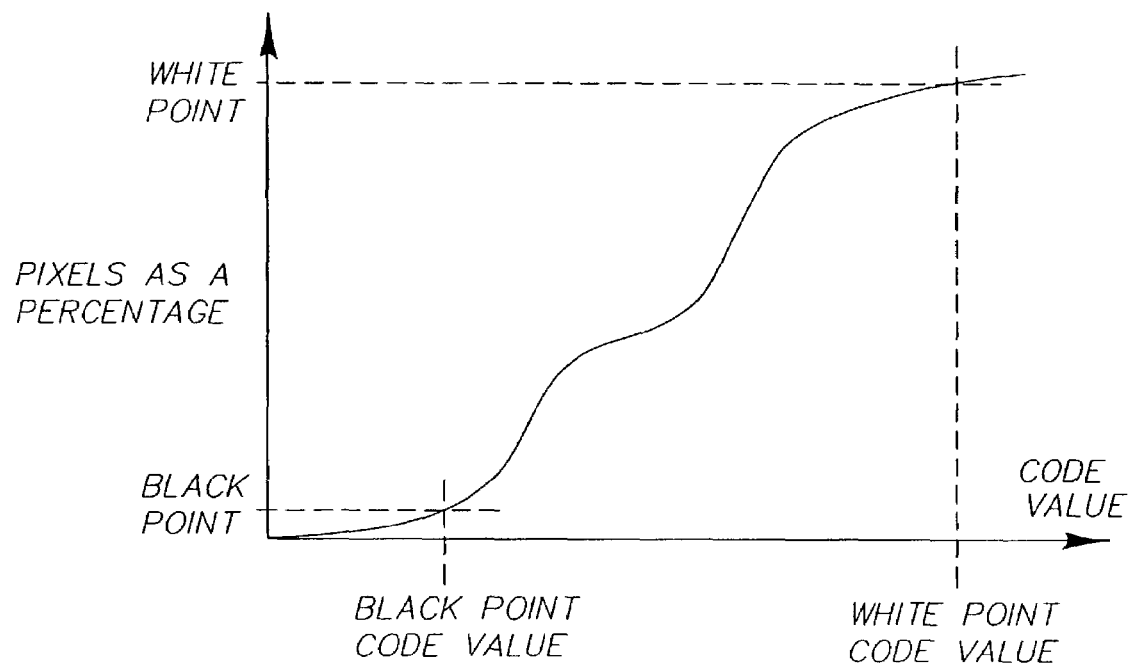
FIG. 3 shows a typical cumulative histogram.

The method of the invention is in three stages, as illustrated in FIG. 2. The first stage, step SX, adjusts the gain and offset of image data, if necessary, to occupy the full data range of the printer. The second stage, step SY, adjusts the shadow and highlight slopes of the image data, if necessary, so that they fall within the appropriate part of the printer characteristic or the appropriate part of the processing space. The third stage, step SZ, uses the mean and median levels of the image data to calculate a gamma and moves the mean level toward that expected for the printer or processing space. Each of these steps will be described in more detail below.

Figure 1:
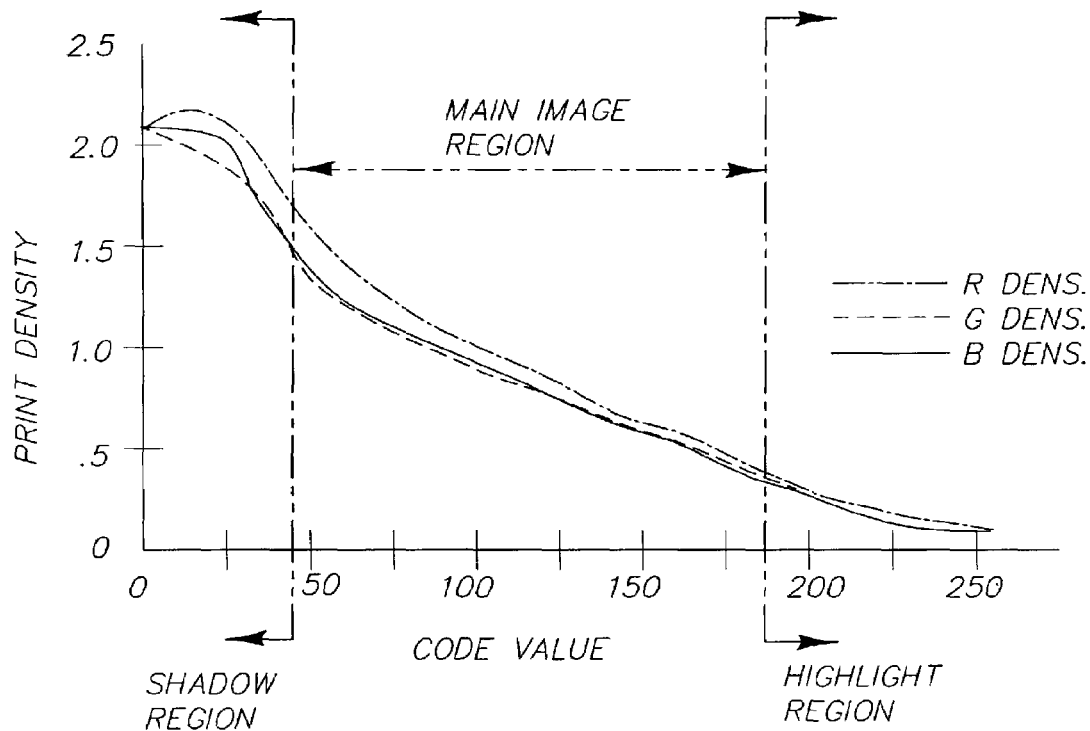
FIG. 1 is an example transfer function of an sRGB printer.

As explained above, the first stage of the invention adjusts the gain and offset image data to occupy the full data range of the printer. In the case of an sRGB 8 bit printer the input data range is 0 to 255, as shown in FIG. 1. FIG. 1 shows that below a code value of 20 very little increase in the print density is achieved, so that although the data range is down to a code value of 0, it may be appropriate to set the data black point to a code value other than 0. From the statistics of a population of sRGB images a typical value for the proportion of black and white clipped pixels can be derived, and used in the invention. Using the cumulative histogram of the image, the code value below which a proportion of the pixels occurs can be used as the black point, and similarly on the upper part of the cumulative histogram a point can be selected for the white point. The black and white points, or thresholds, for each color may be preset, using the statistics of the sRGB population of images. Alternatively, the black and white thresholds may be adaptive and depend in part, on the mean or median or histogram characteristics of that color or of the neutral. The following equations, equation 1 and equation 2, are possible examples using the image mean.

$$Bp_{Thresh} = Bp_{min} + colmean*(Bp_{max} - Bp_{min}) \quad (1)$$

$$Wp_{Thresh} = Wp_{min} + colmean*(Wp_{max} - Wp_{min}) \quad (2)$$

The histogram slope at the "black" and "white" ends can also be used to adapt the thresholds. If the slope is high then the thresholds can be set low, but if the slope is low, then the thresholds can be set high. The following equations, 3 and 4, are possible examples. The scale value representing the histogram slope can be adjusted to give the desired characteristic.

$$Bp_{Thresh} = Bp_{min} + (Bp_{max} - Bp_{min})/histBslope \quad (3)$$

$$Wp_{Thresh} = Wp_{min} + (Wp_{max} - Wp_{min})/histWslope \quad (4)$$

Where $Bp_{Thresh}$ is the cumulative percentage of pixels at the Black point $Wp_{Thresh}$ is the cumulative percentage of pixels at the White point Subscript$_{min}$ denotes the lower limit of the cumulative percentage Subscript$_{max}$ denotes the upper limit of the cumulative percentage colmean is the normalized mean level of the color separation or the neutral separation histBslope is the slope of the histogram at the black end histWslope is the slope of the histogram at the white end The "black" and "white" points for each color are the cumulative percentage values determined from the cumulative histogram and can be applied directly to the respective color data. Alternatively they can be processed by some averaging between the colors before being applied. For example the black points from the three colors could be averaged and then some proportion of the difference between the average and the color applied to that color, as shown below in equations 5 and 6.

$$Bp_{Av} = (Bp_r + Bp_g + Bp_b)/3 \quad (5)$$

$$Bp_{Rnew} = (Bp_{Av} + Bp_r)/2 \quad (6)$$

Where $Bp_{r,g,b}$ are the 'black' points of the three colors red, green and blue, and $Bp_{Rnew}$ is the calculated "black" point for the red channel.

The calculated black points for the other colors are determined similarly. The calculated new "black" points for each color are then taken back to the lower data limit for the printer.

The white points could be similarly processed as shown in equations 7 and 8. In their case however the new "white" point for each color is taken to the upper data limit for the printer.

$$Wp_{Av} = (Wp_r + Wp_g + Wp_b)/3 \quad (7)$$

$$Wp_{Rnew} = (Wp_{Av} + Wp_r)/2 \quad (8)$$

The white points could also be processed to give precedence to a particular color, e.g. red, in order to reduce the effect of clipping on faces in the input image. In this case an example process could be:

$$\text{If } Wp_r > Wp_{av} \text{ then } Wp_{av} = Wp_r \quad (9)$$

Scenes with out-of-gamut colors or small highlight areas could be subject to more aggressive white point correction. This could be done by using masks to eliminate the out-of-gamut and clipped pixels and then re-calculating the white point on the basis of the remaining pixels. This results in a second set of white points $Wp_{rm}$, $Wp_{gm}$ and $Wp_{bm}$.

For robust operation of the algorithms over a wide range of image types it is preferable to use a combination of the two sets of white points to determine the white point used. How far the white point used is moved towards the masked white point, $Wp_{rm}$, $Wp_{gm}$ or $Wp_{bm}$, is set by the ratio of masked clipped pixels to unmasked clipped pixels. If there is a small percentage of clipped pixels the algorithm will use the masked white points but as the percentage of clipped pixels increases the algorithm will move back towards using the unmasked white points.

The slope of the gain function between the black and white points is preferably linear, but this does not preclude a non-linear function derived in a similar way to the mean level gamma process. This process is described fully later.

The second stage of the invention adjusts the shadow and highlight slopes of the image data, if necessary, so that they fall within the appropriate part of the printer characteristic. Typically the lower 5% of the pixels are in the shadow region and the upper 5% are in the highlight region, for typical sRGB image data.

After the gain and offset adjustment described above the cumulative histogram is again generated and the shadow and highlight points, typically 5% and 95%, are determined in the same way as for the black and white points. As in the above example for the offset, the shadow and highlight thresholds could be adaptive, depending on the image mean or median of the color or the neutral. The same adjustment is preferably carried out on all three colors, but there could equally be some differential processing. Preferably, to improve the analysis of the algorithm the histogram can additionally be weighted toward the centre of the image, where the main subject is generally situated. In the simplest case the pixels at the centre of the image are counted twice when the histogram is generated. The size of the central area could be decided by experimentation but typically would be between one quarter and one half of the total image area. In a more sophisticated distribution the weighting could typically be gaussian or any other function where the ratio of weighting of the edge pixels to the centre pixels can be set by experimentation. The function could also be clipped in the centre of the image to give equal weighting to a predetermined proportion of the central pixels. The weighted histogram could also be used for the analysis of the gain and offset part of the algorithm of the invention but preferably this part of the algorithm would use the unweighted histogram analysis.

The code value corresponding to the chosen shadow point is moved proportionately toward the code value expected for the start of the shadow detail, or it could be moved toward the black point of the printer. Similarly the highlight point could be moved proportionately toward the start of the highlight detail region or toward the white point of the printer. In addition the highlight and shadow processing could use the upper and lower median quartiles and dectiles of the histogram, instead of or as well as the highlight and shadow points. In this case, the upper and lower dectile and quartile values for the image being processed are moved toward an aim-mean-population value (hereinafter referred to as aim-mean-pop) for the space in which the image is being processed. The aim-mean-pop value is the average value for the quartiles and dectiles derived from a large number of images, in the space in which the image is being processed, e.g. sRGB or ROMM. The general equation for 50% correction could be:

$$\text{New Value}=(\text{Old Value}+\text{Aim-mean-pop})/2 \tag{10}$$

This equation can be used for each of the reference points, shadow, highlight, dectile and quartile used in the algorithm.

The correction level could be adaptive, dependent on the slope between the upper quartile and upper dectile, which sets the highlight correction level and the slope between the lower quartile and lower dectile, which sets the shadow correction level.

For example, if the slope between the lower dectile and lower quartile is low or positive the correction level is reduced. In this way the shadow detail is reduced for scenes with a proportionally small area of shadow. If the slope is high and negative the correction level is increased. In this way the shadow detail is expanded for scenes with a proportionally large area of shadow. The correction level is similarly adapted for the proportionate level of highlight data by the slope between the upper quartile and upper dectile.

The third stage of the invention, the gamma correction stage, generates a correction parameter that applies a power law, preferably to a neutral channel, in order to re-distribute the image data toward that expected for e.g. an sRGB image. This neutral channel is preferably equally weighted as per equation 11. However, any other weighting may be used such as that used in television.

$$\text{Neutral}=(\text{red}+\text{green}+\text{blue})/3 \tag{11}$$

The gamma correction parameter is generated in two ways, first by looking at the mean level of the edges of the scene, and second by using the mean level of the scene. The latter method is primarily used due to the generally poor quality of the edges in the dark areas of digital camera images. If the neutral mean level is below a certain level the gamma correction parameter is generated from the mean level of the neutral. If the neutral mean level is above a certain level then the gamma correction parameter is generated from the edge mean level correction. The levels are typically either side of the average mean level for the space in which the image is being processed. If the mean level is between the two levels, then a rolling average of the two gamma figures is generated. This provides a smooth transition between the two conditions. In general, in a well balanced the scene, the two gamma figures are fairly close.

To determine the mean and median levels, a histogram of the neutral channel is generated. The histogram could be un-weighted, but preferably a histogram weighted toward the centre of the image would be used, as described above with respect to the shadow and highlight correction stage.

The mean level gamma correction compares the mean level of the neutral data to the mean level expected for the space, $\text{Aim}_{mean}$, in which the image is being processed, e.g. sRGB or ROMM. For a 50% correction level a typical equation for the new mean level, $\text{New}_{mean}$, is shown in equation 12 below:

$$\text{New}_{Mean}=(\text{Old}_{Mean}+\text{Aim}_{mean})/2 \tag{12}$$

where the means have been normalized.

In addition, to help compensate for back lit scenes the ratio of the mean to the median, Gratio, equation 13, can provide an adaptive correction level, to increase the gain in the dark areas of a back lit scene $$\text{Gratio}=\text{Old}_{Mean}/\text{Old}_{median} \tag{13}$$

In a typical back lit scene the mean can be two or three times the value of the median, whereas in a well balanced scene the ratio would be closer to one. Equation 12 can be modified to equation 14 below:

$$\text{New}_{mean}=(\text{Old}_{Mean}+\text{Aim}_{mean}\text{Gratio})/(1+\text{Gratio}) \tag{14}$$

where the means have been normalized.

The gamma correction is then given in equation 15.

$$\text{GammaCorrection}=\log_{10}\text{New}_{Mean}/\log_{10}\text{Old}_{Mean} \tag{15}$$

For higher mean level images it is advantageous to pick out just the edges of the image and determine the mean level of the data used in the edge information. This is similar to the method taught in U.S. Pat. No. 5,822,453, the contents of which are herein incorporated by reference.

Figure 4:
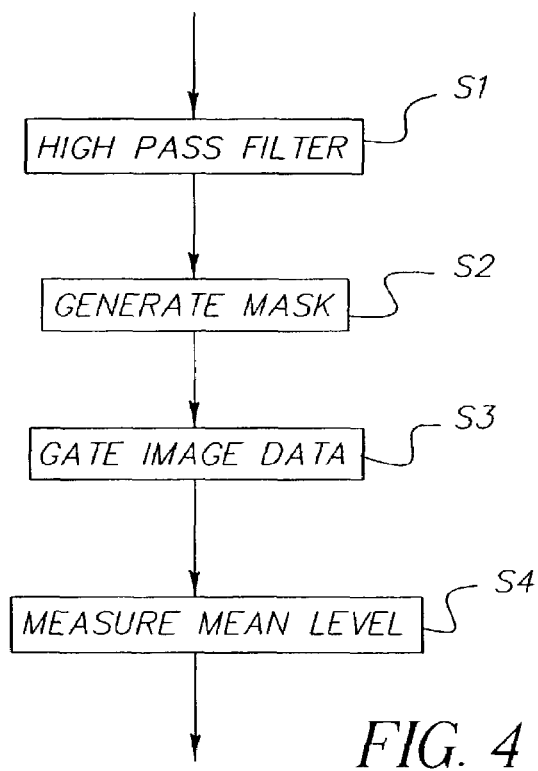
FIG. 4 is a block diagram illustrating one method of carrying out a part of the third stage of the method of the invention.

FIG. 4 is a block diagram of this process.

Neutral data is high pass filtered in step S1. A mask is generated from the high pass filter data in step S2 by comparing the value of the high pass data to a proportion of the standard deviation of the high pass data. In this way any noise or low level edges are discarded and only high amplitude edges used.

$$\text{Mask}=abs(\text{HighPassData})>\text{Factor}^*\text{standard deviation (HighPassData)} \tag{16}$$

Where the parameter "Factor" has been empirically determined.

The mean level of the pixels passed by the mask in step S3 is then measured in step S4 and this is used to provide the $\text{Old}_{Mean}$ input to equation 12. The gamma correction is then calculated using equation 15.

At the transition point between the use of the two gammas a rolling average is preferably used to blend the two values, to provide a smooth transition.

The level of the chroma channels is also adjusted, to maintain the color saturation during the neutral gamma changes and the gain changes in the first two stages. This is described in U.S. Pat. No. 6,438,264, the contents of which are herein incorporated by reference.

In the above description, a preferred embodiment of the present invention was described in terms that would ordinarily be implemented as a software program. Those skilled in the art will readily recognize that the equivalent of such software may also be constructed in hardware. Because image manipulation algorithms and systems are well known, the present description has been directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the above materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Having described the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 5:
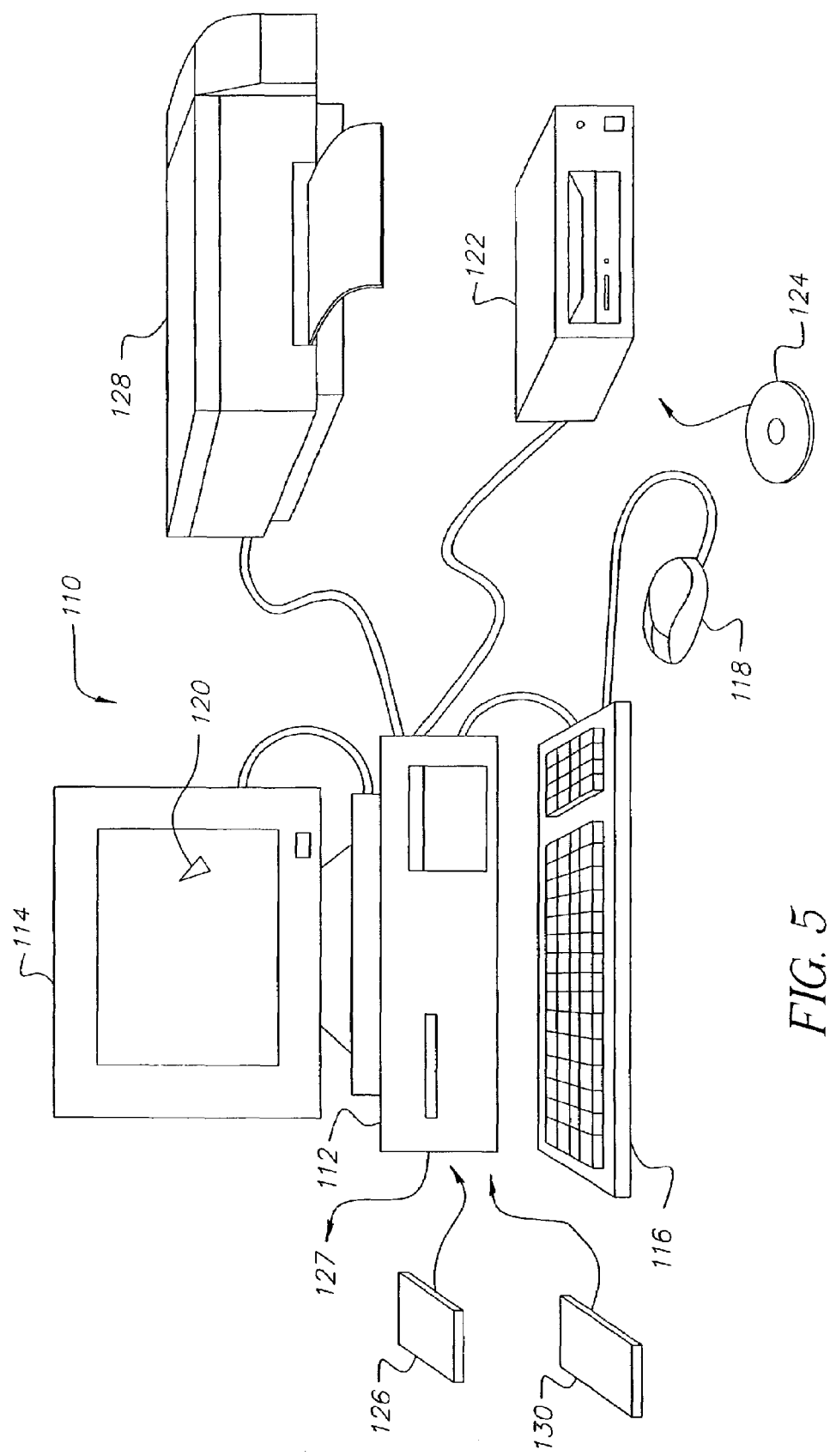
FIG. 5 is a perspective diagram of a computer system for implementing the present invention.

Referring to FIG. 5, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). In accordance with the invention, the algorithm may be stored in any of the storage devices heretofore mentioned and applied to images in order to optimize the tone scale of the input image to the known transfer function of a printer.

The invention has been described in detail with reference to preferred embodiments thereof. It will be understood by those skilled in the art that variations and modifications can be effected within the scope of the invention.

PARTS LIST 110 computer system
112 unit
114 display
116 keyboard
120 selector
122 CD ROM
124 compact disk
126 floppy disk
127 network connection
128 printer
130 PC card

What is claimed is:

1. A method of processing data from a digital image to optimise the tone scale thereof to a printer or processing space to be used, the method comprising the steps of adjusting the gain and offset of the input image data to occupy the full input range of the printer or processing space, adjusting the shadow and highlight slopes of the input image data to move the image data distribution toward that expected for a typical image for the printer or processing space, and then using a gamma correction stage to move the mean level of the image data toward that expected for the printer or processing space.

2. A method as claimed in claim 1, wherein a code value below which a predetermined proportion of pixels, a black threshold, occurs is selected as the black offset point and a code value above which a predetermined proportion of pixels, a white threshold, occurs is selected as the white offset point.

3. A method as claimed in claim 2 wherein the black and white offset points are set for each colour.

4. A method as claimed in claim 3 wherein the selected black and white offset points for each colour are taken as the lower data limit and upper data limit respectively for the printer to be used.

5. A method as claimed in claim 2 wherein the offsets are determined by using a cumulative histogram of the input image data.

6. A method as claimed in claim 5 wherein the histogram can be spatially weighted.

7. A method as claimed in claim 3 wherein the black and white thresholds are adaptive and can be modified by the mean level of the image data.

8. A method as claimed in claim 3 wherein the black and white thresholds are adaptive and can be modified by the slope of the input image data histogram at the black and white ends of the histogram respectively.

9. A method as claimed in claim 3 wherein the black points of the colours are averaged together, the mean or some proportion of the average and the colour being used as the black point for that colour.

10. A method as claimed in claim 3 wherein the white points of the colours are averaged together, the mean or some proportion of the average and the colour being used as the white point for that colour.

11. A method as claimed in claim 3 wherein a mask is used to eliminate any out-of-gamut colours or clipped pixels and the white point recalculated based on the remaining pixels.

12. A method as claimed in claim 11 wherein the white point used is a combination of the white points calculated on the masked and unmasked pixels.

13. A method as claimed in claim 12 wherein the combination is calculated by the ratio of the masked pixels to the unmasked pixels.

14. A method as claimed in claim 1, wherein a code value below which a predetermined proportion of pixels, a shadow threshold, occurs is selected as the shadow point and a code value above which a predetermined proportion of pixels, a highlight threshold, occurs is selected as the highlight point.

15. A method as claimed in claim 14 wherein the shadow and highlight thresholds are adaptive, being at least partly dependent on the mean to median ratio of the neutral.

16. A method as claimed in claim 14 wherein a code value below which 5% of the pixels occur is selected for the shadow point and a code value below which 95% of the pixels occur is selected as the highlight point.

17. A method as claimed in claim 14 wherein the shadow and highlight thresholds are set equally for each colour.

18. A method as claimed in claim 14 wherein the shadow and highlight thresholds are set separately for each colour.

19. A method as claimed in claim 14 wherein the shadow and highlight thresholds are determined from the cumulative histogram of the image data input into the shadow and highlight correction stage.

20. A method as claimed in claim 19 wherein the histogram can be spatially weighted.

21. A method as claimed in claim 14 wherein the code value determined for the shadow point is set to some proportion of the difference between the measured shadow point and the code value expected for the start of the shadow detail for the printer or processing space used.

22. A method as claimed in claim 14 wherein the code value selected for the highlight point is set to some proportion of the difference between the measured highlight point and the code value expected for the start of the highlight detail for the printer or processing space used.

23. A method as claimed in claim 14 wherein the code value selected for the shadow point is set to some proportion of the difference between the measured shadow point and the code value for the lower limit for the printer or processing space used.

24. A method as claimed in claim 14 wherein the code value selected for the highlight point is set to some proportion of the difference between the measured highlight point and the code value expected for the upper limit for the printer or processing space used.

25. A method as claimed in 14 where the shadow point is separated into the lower median dectile and the lower median quartile.

26. A method as claimed in claim 25 wherein the slope between the lower median dectile and the lower median quartile is measured and the value thereof used to determine a shadow correction level.

27. A method as claimed in claim 25 wherein the lower median dectiles and quartiles are set equally for each colour.

28. A method as claimed in claim 25 wherein the lower dectiles and quartiles are determined from the cumulative histogram of the image data into the shadow and highlight correction stage.

29. A method as claimed in claim 28 wherein the histogram can be spatially weighted.

30. A method as claimed in claim 25 wherein the code value determined for the lower median dectile and quartile is set to some proportion of the difference between the measured lower median dectile and quartile and the code value expected for the lower median dectile and quartile for the printer or processing space used.

31. A method as claimed in 14 where the highlight point is separated into the upper median quartile and the upper median dectile.

32. A method as claimed in claim 31 wherein the slope between the upper median quartile and the upper median dectile is measured and the value thereof used to determine a highlight correction level.

33. A method as claimed in claim 31 wherein the upper median dectiles and quartiles are set equally for each colour.

34. A method as claimed in claim 31 wherein the upper dectiles and quartiles are determined from the cumulative histogram of the image data into the shadow and highlight correction stage.

35. A method as claimed in claim 34 wherein the histogram can be spatially weighted.

36. A method as claimed in claim 31 wherein the code value determined for the upper median dectile and quartile is set to some proportion of the difference between the measured upper median dectile and quartile and the code value expected for the upper median dectile and quartile for the printer or processing space used.

37. A method as claimed in claim 1 wherein the gamma correction is a power law correction proportional to the difference between the mean level of the image data and the mean level expected for the printer or the image processing space.

38. A method as claimed in claim 1 wherein the mean level is determined from the cumulative histogram of the image data into gamma correction stage.

39. A method as claimed in claim 38 wherein the histogram can be spatially weighted.

40. A method as claimed in claim 37 wherein a new mean level is set to some proportion of the difference between the measured mean level and the expected mean level for the printer or processing space used.

41. A method as claimed in claim 37 wherein a new mean level is adaptive, being at least partly dependent on ratio of the mean to median ratio of the image data.

42. A method as claimed in claim 37 where the gamma correction is the ratio of the log of the new mean to the log of the old mean, where the means have been normalized.

43. A method as claimed in claim 1 wherein the gamma correction is a power law correction proportion to the difference between the mean level of the edges of the image data and the mean level expected for the printer or the image processing space.

44. Computer instructions A computer instructions for processing data from a digital image to optimise the tonescale thereof to a printer or processing space to be used embodied on a computer readable storage medium having a computer program stored thereon for performing the steps of adjusting the gain and offset of the input image data to occupy the full input range of the printer or processing space used, adjusting the shadow and highlight slopes of the input image data to move the image data distribution toward that expected for a typical image for the printer or processing space, and then using a gamma correction stage to move the mean level of the image data toward that expected for the printer or processing space.

* * * * *